United States Patent
Feng

(10) Patent No.: US 9,988,944 B2
(45) Date of Patent: Jun. 5, 2018

(54) TYPE OF TURBO-GENERATOR UNIT

(71) Applicant: Weizhong Feng, Shanghai (CN)

(72) Inventor: Weizhong Feng, Shanghai (CN)

( * ) Notice: Subject to any disclaimer, the term of this patent is extended or adjusted under 35 U.S.C. 154(b) by 149 days.

(21) Appl. No.: 14/874,960

(22) Filed: Oct. 5, 2015

(65) Prior Publication Data

US 2016/0090872 A1    Mar. 31, 2016

Related U.S. Application Data

(63) Continuation of application No. 12/597,609, filed as application No. PCT/CN2007/002955 on Oct. 15, 2007, now Pat. No. 9,151,177.

(30) Foreign Application Priority Data

Apr. 27, 2007    (CN) .......................... 2007 1 0040128

(51) Int. Cl.
   *F01K 11/02*    (2006.01)
   *F01K 7/22*    (2006.01)
   (Continued)

(52) U.S. Cl.
   CPC ................ *F01K 7/22* (2013.01); *F01D 15/10* (2013.01); *F01K 11/02* (2013.01); *F22G 1/02* (2013.01); *Y02P 80/154* (2015.11)

(58) Field of Classification Search
   CPC .......... F01D 13/003; F01D 25/28; F01K 7/16; F01K 7/22; F01K 7/32; F01K 11/02;
   (Continued)

(56) References Cited

U.S. PATENT DOCUMENTS 4,057,736 A    11/1977    Jeppson
5,347,814 A    9/1994    Kemmer et al.
(Continued)

FOREIGN PATENT DOCUMENTS

CN    1550644 A    12/2004
CN    2791503 Y    6/2006
(Continued)

*Primary Examiner* — Jonathan Matthias
(74) *Attorney, Agent, or Firm* — Blank Rome LLP

(57) ABSTRACT

The present invention provides a novel turbo-generator unit, which at least comprises a boiler and a superheater and a reheater provided in the boiler. On the boiler, the positions corresponding to the header of the steam inlets and outlets of the superheater and reheater form the header-connection area; the steam pipe system at least comprises the pipes that connect the boiler with the HP cylinder and the IP cylinder and are used to transmit the HTHP steam; the HP cylinder and the generator constitute the high-level shafting, and the high-level shafting is positioned outside of boiler and close to the header-connection area. The present invention can also comprise a low-level shafting positioned at a low level. Since the high-level shafting and the low-level shafting are arranged at different levels, the lengths of costly HTHP steam pipes in the pipe system and the pressure drop and heat radiation loss of the pipe system are significantly reduced, and the work capability of the unit is improved. Furthermore, the quantity of the steam stored in the reheat system and the adjustment inertia of unit is reduced, and the economical efficiency of the double-reheat unit is sufficiently realized.

9 Claims, 9 Drawing Sheets

(51) Int. Cl.
*F01D 15/10* (2006.01)
*F22G 1/02* (2006.01)

(58) Field of Classification Search
CPC .............. F01K 13/00; F05D 2250/31; F05D 2250/312; F05D 2250/315; F05D 2250/34
See application file for complete search history.

(56) References Cited

U.S. PATENT DOCUMENTS

| | | |
|---|---|---|
| 7,478,524 B2 | 1/2009 | Kreitmeier |
| 2003/0061796 A1 | 4/2003 | Kaijima et al. |
| 2004/0261417 A1 | 12/2004 | Yamashita et al. |
| 2007/0012025 A1 | 1/2007 | Kreitmeier |

FOREIGN PATENT DOCUMENTS

| | | | | |
|---|---|---|---|---|
| EP | 1473442 A2 | 11/2004 | | |
| FR | 2 292 857 | 6/1976 | | |
| GB | 219309 A | * 4/1925 | ............ | F01K 13/00 |
| JP | S57116107 A | 7/1982 | | |
| JP | S58107803 A | 6/1983 | | |
| JP | 58-126405 | 7/1983 | | |
| JP | 60-79107 | 5/1985 | | |
| JP | 60-93101 | 5/1985 | | |
| JP | 7-63007 | 3/1995 | | |
| JP | 8-120414 | 5/1996 | | |
| JP | H09243005 A | 9/1997 | | |
| JP | 9-280008 | 10/1997 | | |
| JP | H10266811 A | 10/1998 | | |
| JP | 2003-106110 A | 4/2003 | | |
| JP | 2007-525618 | 9/2007 | | |
| WO | WO-2005/083238 A1 | 9/2005 | | |

* cited by examiner

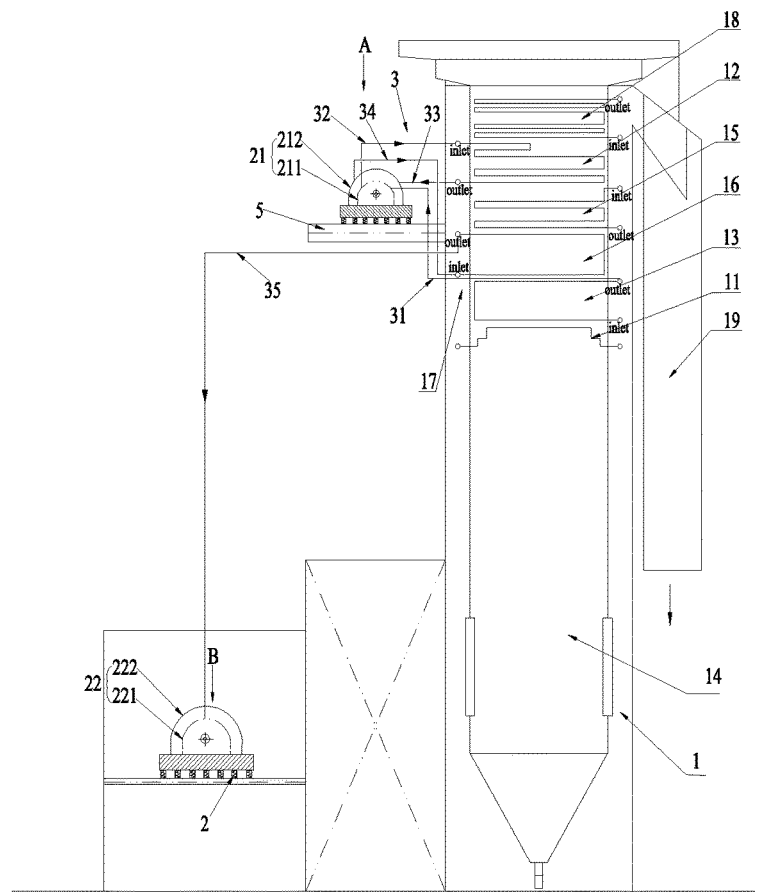
Figure 3a
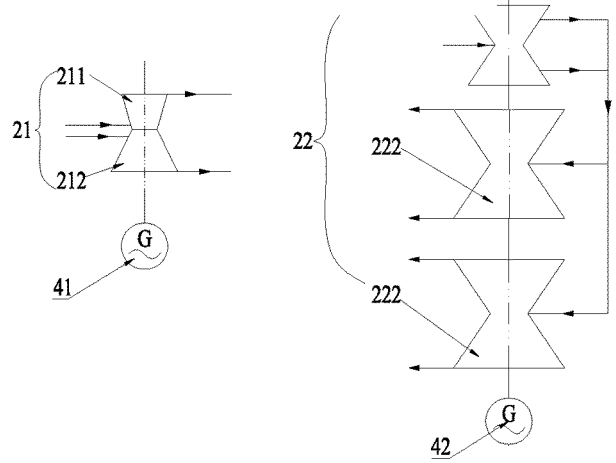
Figure 3b
Figure 3c

A Direction

B Direction

A Direction

TYPE OF TURBO-GENERATOR UNIT

RELATED APPLICATION

This application is a continuation application of U.S. patent application Ser. No. 12/597,609, filed Jan. 27, 2010 (now U.S. Pat. No. 9,151,177), which is a national phase application and claims the benefit, under 35 U.S.C. § 371, of PCT/CN2007/002955, filed on Oct. 15, 2007, which in turn claims the priority of Chinese Patent Application No. 200710040128.0, filed on Apr. 27, 2007. The entire contents of those applications are incorporated herein by reference.

FIELD OF THE INVENTION

The present invention relates to the technical field of power generation, and more particularly, relates to a new type of turbo-generator unit.

BACKGROUND OF THE INVENTION

As the core technology in the field of thermal power generation, the technology of turbo-generator unit has been developed for more than one hundred years, and in recent years, with the continuous increase in the fuel price and environmental protection pressure, the developed countries start to compete in developing high efficiency supercritical turbo-generator units. While constantly improving the operational parameters of the units to increase the cycle efficiency of the units, the double-reheat cycle unit has once again become one of the primary technical solutions for designing the next generation of high efficiency ultra-supercritical units.

At present, the coal-fired generating unit with the highest efficiency in the world is the 400 MW double-reheat ultra-supercritical unit in Denmark, with its steam parameters of 29 MPa/580° C./580° C./580° C. The cycle efficiency of the unit is as high as 47%, better than the cycle efficiency 41~42% of the single-reheat supercritical unit and the cycle efficiency 44~45% of the single-reheat ultra-supercritical unit.

However, with respect to the traditional single-reheat unit, if the double-reheat supercritical unit of 31.1 MPa/566° C./566° C./566° C. with an additional single reheat is compared with the single-reheat ultra-supercritical unit of 24.5 MPa/600° C./600° C. which only increases the steam temperature, the cycle efficiency of the former is merely improved by 0.5% more than that of the latter. While compared to the single-reheat (ultra) supercritical unit, the system of the double-reheat (ultra) supercritical unit is more complicated and has a significantly increased manufacturing cost. Therefore, since the 1990s, all the countries in the world generally tend to build single-reheat ultra-supercritical units of 600° C. class.

Illustrated in FIG. 1 is a schematic view of the conventional arrangement of a 1000 MW-class tower type boiler 1 and a double-reheat turbine unit 2 as in the prior art. An HP (High Pressure) cylinder 21, an IP (Intermediate Pressure) cylinder I 22, an IP cylinder II 23 and two LP (Low Pressure) cylinders 24 in the turbine unit 2 are in a single shaft arrangement in the turbine hall. Generally, a main steam pipe 31 extending from the outlet of a superheater 13 of a boiler 1 to the HP cylinder 21 has a single pipe length of about 160 meters; then, by way of a low temperature single-reheat steam pipe 32 with a single pipe length of about 180 meters, the steam exhausted from the HP cylinder 21 returns to the boiler 1; the high temperature single-reheat steam pipe 33 extending from the outlet of the single-reheater 12 to the IP cylinder I 22 has a length substantially the same as that of the low temperature single-reheat steam pipe 32, with a single pipe length of about 190 meters; subsequently, the low temperature double-reheat steam pipe 34, through which the steam exhausted from the IP cylinder I 22 returns to the boiler 1, has a single pipe length of about 180 meters; the high temperature double-reheat steam pipe 35 extending from the outlet of the double-reheater 16 to the IP cylinder II 23 has a length substantially the same as that of the low temperature double-reheat steam pipe 34, with a single pipe length of 190 meters. The main steam pipe 31, the high temperature single-reheat pipe 33 and the high temperature double-reheat pipe 35 need to be made of high temperature alloy steel of 600° C. class. According to various pipe design schemes, the main steam pipe and the reheat steam pipe also have pipes with a half capacity and with a quarter of capacity. As a result, the lengths of the high-pressure high-temperature pipes that actually need to be made of high temperature alloy steel will be multiplied.

Illustrated in FIG. 2 is a schematic view of the conventional arrangement of a 1000 MW-class tower type boiler 1 and a double-shaft double-reheat turbine unit 2 as in the prior art. The turbine unit 2 is composed of two shaftings which respectively have self-contained generators and are arranged in parallel in a conventional turbine hall. The first shafting 21 in the turbine unit 2 is composed of an HP cylinder 211 and an IP cylinder I 212, and has a self-contained generator; the second shafting 22 is composed of an IP cylinder II 221 and two LP cylinders 222, and has a self-contained generator. As to the double-reheat double-shaft turbo-generator unit as shown in FIG. 2, the arrangement scheme of its HTHP (high-temperature high-pressure) pipes is similar to that of the single-shaft double-reheat turbine unit as shown in FIG. 1, in which the main steam pipe 31, the high temperature single-reheat pipe 33 and the high temperature double-reheat pipe 35 are required to be made of high temperature alloy steel of 600° C. class, and their single pipe lengths are all about 160 meters.

At present, the unit prices of generating units are continuously increasing with the increase in the efficiency of the units. Especially, although the technology of the double-reheat unit has been well-developed, the boiler needs an additional stage of the reheater, the turbine needs an additional IP cylinder, and an additional stage of the reheat steam pipe is also needed. As a result, the system becomes complicated with more investment. As compared to the single-reheat unit, the acquired increment in the efficiency earning still fails to compensate the increase in the investment. For the traditionally designed double-reheat unit, first, the reheat steam shuttles between the boiler and the turbine hall, and especially, for the modern MW class large-scale (ultra) supercritical unit, the boiler is becoming increasingly taller, in combination with the structural factors such as the deaerator bay and the coal-bunker bay located between the turbine and the boiler, the average single pipe lengths of the steam pipes have reached 160 meters~190 meters. On the one hand, the pipe of 600° C. class with a large diameter and a thick wall is high in cost; on the other hand, the increase in the system resistance of the reheat pipe results in a reduced work capacity of the turbine, such that the theoretical efficiency of the double-reheat system is partially diminished. Secondly, the double-reheat system greatly increases the quantity of steam stored in the system. As a result, the adjustment inertia of the unit is significantly increased, and thus the difficulty in controlling the unit is increased.

At the end of the 1990s, the United States, Japan and the European Union established the plans for developing the next generation of high efficiency ultra-supercritical units. All these plans aimed at the single-reheat and double-reheat units with nickel base superalloys as the base material. At present, the price of high temperature nickel base alloy steel of 700° C. class is more than 5 times of the price of high temperature alloy steel of 600° C. class. If such kind of material is used in a double-reheat 2×1000 MW ultra-supercritical unit, the investment for the four major pipes only will exceed RMB 2.5 billion. If the double-reheat cycle is adopted, the increase in the investment cost because of using nickel base alloy steel for building the boilers, turbines and HTHP steam pipes will generate no income on investment, considering the current fuel price.

Therefore, under the present technical conditions, material conditions and conventional design schemes, there is a contradiction between cost and benefit in improving the efficiency of the turbo-generator unit. This also has become a bottleneck that restricts the development of the next generation of high efficiency ultra-supercritical units. Furthermore, under the environmental protection pressure and the pressure of $CO_2$ emission reduction, how to further "upgrade" the main facilities for thermal power generation—the subcritical and supercritical units—will become another issue in the development of the electric power industry.

SUMMARY OF THE INVENTION

In view of the above defects in the prior art, the technical problem to be solved by the present invention is to provide a turbo-generator unit with very short HTHP steam pipes, very few loss of the pipe pressure drop, a relatively small adjustment inertia and a significantly improved cycle efficiency.

To achieve the above object, the present invention provides a turbo-generator unit in which the shafts are arranged at different levels. The unit comprises:

a boiler, comprising a boiler body, and at least one stage of the superheater and at least one stage of the reheater provided in the boiler body; the superheater and the reheater having their respective steam inlet and outlet and forming a header for the steam inlets and outlets; a header-connection area being formed on the boiler body at a location corresponding to the header;

a turbine unit, which is classified as two types, namely the condensing steam turbine unit and the backpressure steam turbine unit; wherein the condensing steam turbine unit at least comprises a high-level unit of an HP cylinder and at least comprises a low-level unit of LP cylinders; several IP cylinders are optionally arranged in the high-level unit or the low-level unit as desired; the backpressure steam turbine unit at least comprises a high-level unit of an HP cylinder, and several IP cylinders are optionally arranged in the high-level unit or the low-level unit as desired;

a generating unit, comprising at least a generator connected with the turbine unit;

a steam pipe system, at least comprising: the pipes for transmitting working medium between the boiler and the HP cylinder, namely the main steam pipe and the single low temperature reheat steam pipe; the pipe for transmitting working medium between the boiler and the IP cylinder, namely the high temperature reheat steam pipe; the steam pipe system further optionally comprising a pipe for transmitting working medium between the first IP cylinder and the boiler, namely the double low temperature reheat steam pipe; and an ordinary steam pipe between the IP cylinder and the LP cylinders;

wherein the steam inlets and outlets of the high-level unit and the low-level unit are connected, through the steam pipes, with the header of the steam inlets and outlets of the superheater and the reheater;

wherein the high-level unit and the high-level generator unit constitute a high-level shafting, and the low-level unit and the low-level generator unit constitute a low-level shafting;

wherein the high-level shafting is positioned outside of the boiler body and close to the header-connection area, namely, the high-level shafting is in a higher-position arrangement;

wherein in the boiler, the HTHP steam from the superheater firstly flows into the HP cylinder of the high-level shafting by way of an HTHP steam pipe; after the HTHP steam has done work, the steam exhausted from the HP cylinder flows into the reheater and generates a high temperature reheat steam after being heated; the high temperature reheat steam flows into the IP cylinder and then is discharged after doing work; for the turbo-generator unit, because the high-level shafting is positioned outside of the boiler body and close to the header-connection area, the lengths of the HTHP steam pipes in the steam pipe system are greatly shortened.

As an example, the condensing steam turbo-generator unit is configured as follows: the boiler comprises at least one stage of the superheater and has only one stage of the reheater; the high-level shafting in the higher-position arrangement comprises one said HP cylinder, one said IP cylinder and the high-level generator; the low-level shafting in the lower-position arrangement comprises one said LP cylinder and the low-level generator.

In the boiler, the HTHP steam from the superheater firstly flows into the HP cylinder of the high-level shafting in the higher-position arrangement by way of the main steam pipe; after the HTHP steam has done work, the steam exhausted from the HP cylinder flows into the reheater by way of the low-temperature reheat steam pipe and is then heated; the reheat steam generated after heating flows into the IP cylinder by way of the high temperature reheat steam pipe and then does work; the pressure and the temperature of the steam exhausted from the IP cylinder have been significantly reduced, and the steam flows into the LP cylinder of the low-level shafting in the lower-position arrangement by way of the ordinary steam pipe and is then exhausted after doing work further; for the turbo-generator unit, because the high-level shafting is positioned outside of the boiler body and close to the header-connection area, the lengths of the main steam pipe, the low-temperature reheat steam pipe and the high temperature reheat steam pipe are greatly shortened.

As to the condensing steam turbine unit, the high-level unit can also comprise several IP cylinders, and the HP cylinder of the high-level unit, the several IP cylinders and the high-level generator constitute the high-level shafting.

As to the condensing steam turbine unit, the low-level unit can also comprise several IP cylinders, and the several IP cylinders of the low-level unit, the LP cylinder and the low-level generator constitute the low-level shafting.

As to the backpressure steam turbine unit, the backpressure steam turbine unit may comprise the high-level unit only, and the HP cylinder of the high-level unit, the several IP cylinders and the high-level generator constitute the high-level shafting.

As to the backpressure steam turbine, it can also comprise the high-level unit and the low-level unit, and the HP cylinder of the high-level unit, the several IP cylinders and the high-level generator constitute the high-level shafting; and the several IP cylinders of the low-level unit and the low-level generator constitute the low-level shafting.

In the above embodiments of the present invention, the high-level shafting is positioned outside of the boiler body and close to the header-connection area, whereby greatly shortening the lengths of the HTHP steam pipes.

The turbo-generator unit of the present invention adopts the design scheme in which the high-level shafting and the low-level shafting are respectively arranged in different levels (the high level and the low level), and the high-level shafting is positioned close to the header-connection area of the boiler, and the low-level shafting is conventionally arranged at a lower position. Because the high-level shafting is positioned close to the header-connection area of the boiler, the HTHP pipes used for transmitting the HTHP steam are so greatly shortened that their lengths are almost negligible if compared to their lengths before. As a result, the cost of the HTHP pipes of the turbo-generator unit is greatly reduced, and the pressure loss and the heat radiation loss of the high-pressure steam in the steam pipes are reduced.

As to the turbo-generator unit of the present invention, due to the reduction in the lengths of the reheat steam pipes, in the pressure loss and in the heat radiation loss of the high-pressure steam in the reheat steam pipes, and in the quantity of steam stored in the reheat system, the efficiency of the turbo-generator unit is thereby increased and the adjustment inertia of the unit is much better.

In addition to being applicable to the backpressure turbo-generator unit, the arrangement concept for the turbo-generator unit of the present invention is mainly applicable to the arrangement design for the condensing steam turbo-generator unit (including the extraction condensing steam generating unit), since the operating modes of both is much the same as that of the traditional design of the existing double-shaft unit.

Although it is necessary to extend the enclosed busbars when the high-level generator of the turbo-generator unit of the present invention transmits power to the ground, the investment costs on the presently well-developed enclosed busbars plus the additional cost for power transmission have a difference in the order of magnitude in respect to the steam pipes made of costly high-parameter alloy steel.

Based on the design scheme for arranging the high-level shafting and the low-level shafting in different levels (the high level and the low level), the new type of the turbo-generator unit of the present invention has the following advantages over the turbo-generator units in the prior art:

Most pressure drop of the HTHP steam pipes is eliminated, and the work capacity of the turbo-generator unit is improved. Such advantages are more evident for the double-reheat unit;

(1) The investment costs on the most of the high-parameter and high-cost pipes as well as on the corresponding supports, hangers and heat insulating material are eliminated;

(2) The harmful volume of the steam is reduced, thus the adjustment performance of the turbo-generator unit is greatly improved;

(3) The structural design of the factory buildings needed for the arrangement of the HTHP pipes is simplified, and the corresponding foundation load and the cost for civil works are reduced;

(4) The major constraints to the development of the next generation of the high-efficiency ultra-super-critical units of 700° C. class are eliminated, thus providing a practical approach for "upgrading" the present subcritical and supercritical units.

The conception, the specific structure and the resulted technological effects of the present invention will be further described hereinafter in combination with the attached drawings, so that the object, the characteristics and the effects of the present invention can be adequately understood.

BRIEF DESCRIPTION OF THE DRAWINGS

FIG. 3a is a schematic view of the arrangement scheme for the turbo-generator unit of a first embodiment of the present invention;

FIG. 3b is a schematic view from the direction A in FIG. 3a;

FIG. 3c is a schematic view from the direction B in FIG. 3a;

FIG. 4b is a schematic view from the direction A in FIG. 4a;

FIG. 4c is a schematic view from the direction B in FIG. 4a;

FIG. 5b is a schematic view from the direction A in FIG. 5a;

FIG. 5c is a schematic view from the direction B in FIG. 5a;

FIG. 6b is a schematic view from the direction A in FIG. 6a;

FIG. 6c is a schematic view from the direction B in FIG. 6a;

FIG. 7b is a schematic view from the direction A in FIG. 7a;

FIG. 7c is a schematic view from the direction B in FIG. 7a;

FIG. 8b is a schematic view from the direction A in FIG. 8a;

DETAILED DESCRIPTION OF THE INVENTION

Figure 1:
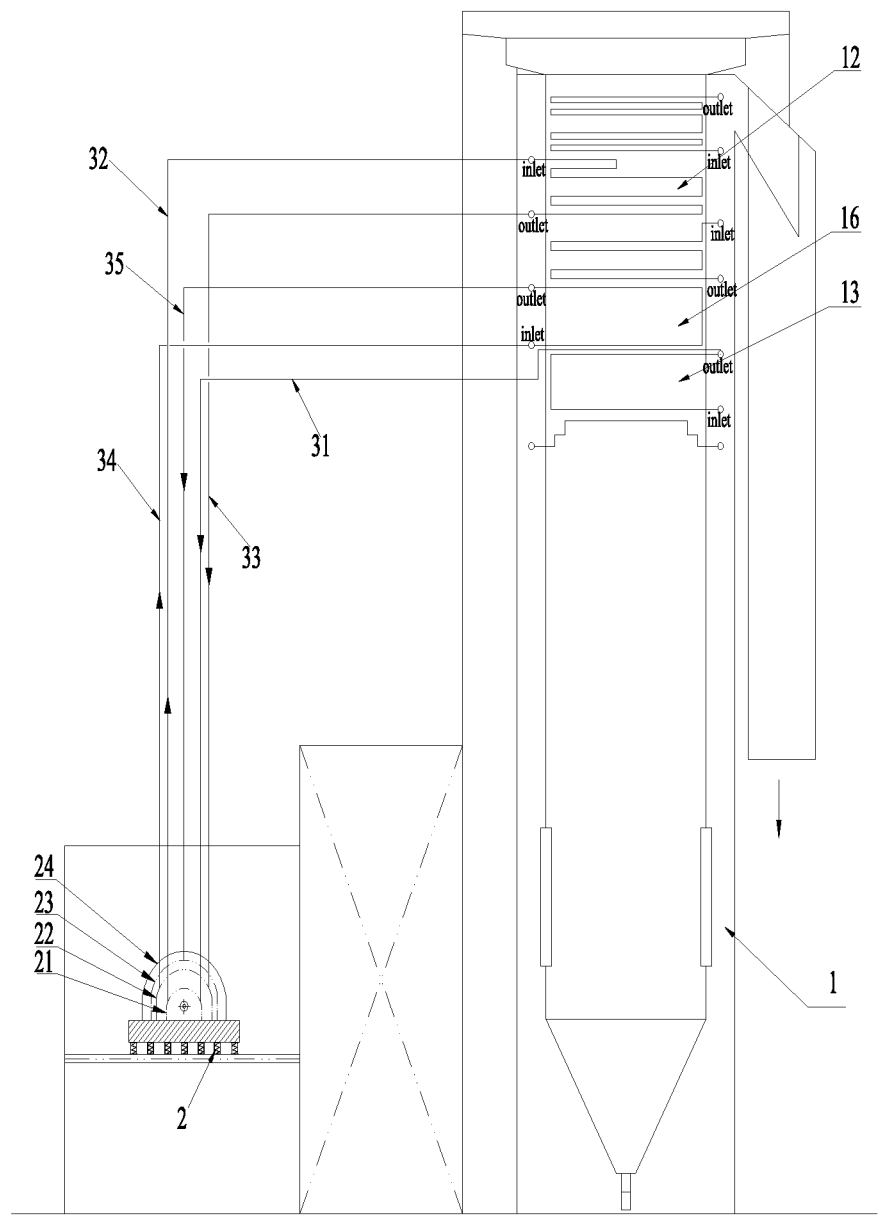
FIG. 1 is a schematic view of a conventional arrangement of a tower type boiler and a double-reheat turbine unit of the prior art.
Figure 2:
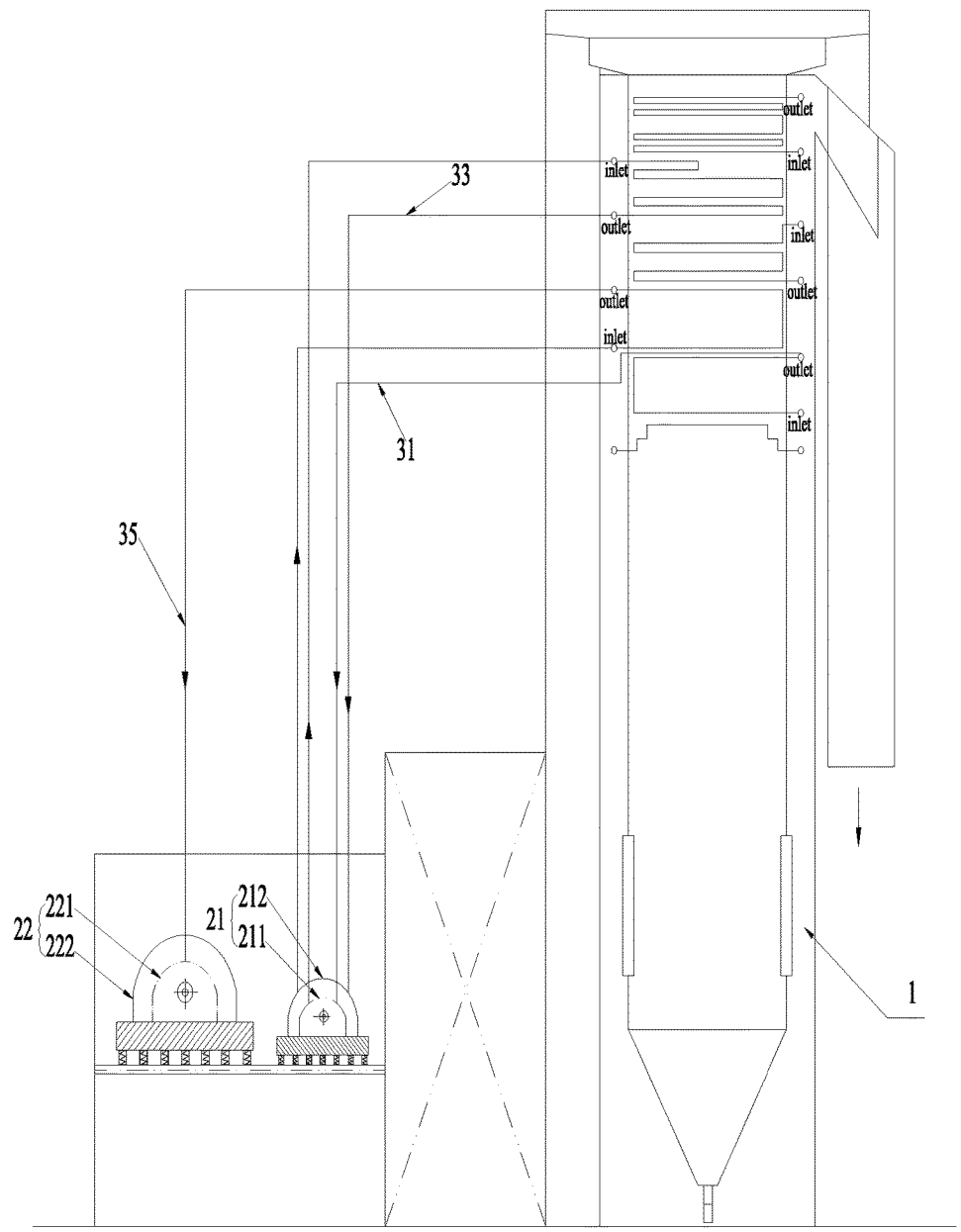
FIG. 2 is a schematic view of a conventional arrangement of a tower type boiler and a double-shaft double-reheat turbine unit of the prior art.

FIG. 3a, FIG. 3b and FIG. 3c are schematic views of the arrangement scheme for a first embodiment of the present invention—a double-shaft double-reheat ultra-supercritical condensing steam turbine unit with a boiler of the tower type. This unit is equipped with five cylinders and four steam exhaust systems, including one HP cylinder 211, one IP cylinder I 212, one IP cylinder II 221 and two LP cylinders 222, with the HP cylinder 211 and the IP cylinder I 212 integrated into a single cylinder, and the design parameters are 28 MPa/600° C./600° C./600° C.

The double-shaft supercritical turbo-generator unit of the first embodiment comprises:

a boiler 1, wherein the boiler 1 is a tower type boiler commonly used in the field, comprising a boiler body 14 and a economizer 18, three superheaters 11, 13, 15 and two reheaters 12, 16 all disposed in the boiler body 14; the superheaters and reheaters are respectively provided with steam inlets and outlets, and form a header of the steam inlets and outlets in the common way in the prior art; a header-connection area 17 is formed on the boiler body 14 at a position corresponding to the header of the steam inlets and outlets;

a turbine unit 2, wherein the turbine unit 2 is divided into a high-level unit 21 comprising an HP cylinder 211 and an IP cylinder I 212, and a low-level unit 22 comprising two LP cylinders 222 and an IP cylinder II 221, and the high-level unit 21 and the low-level unit 22 are connected through pipes; and a generating unit, comprising a high-level generator 41 connected with the high-level unit 21 and a low-level generator 42 connected with the low-level unit 22.

It also comprises a steam pipe system 3, wherein the steam pipe system 3 comprises: a main steam pipe 31 for transmitting the HTHP steam, which connects the outlet of the superheater 13 of the boiler 1 with the HP cylinder 211, a low temperature single-reheat steam pipe 32 for transmitting the low temperature single-reheat steam, which connects the HP cylinder 211 with the single-reheater 12 of the boiler 1, a high temperature single-reheat steam pipe 33 which connects the outlet of the single-reheater 12 to the IP cylinder I 212, a low temperature double-reheat steam pipe 34 which connects the IP cylinder I 212 to the double-reheater 16 of the boiler 1, a high temperature double-reheat steam pipe 35 which connects the outlet of the double-reheater 16 to the IP cylinder II 221, and ordinary steam pipes for connecting the IP cylinder II 221 to the two LP cylinders 222. Wherein, the main steam pipe 31, the high temperature single-reheat pipe 33 and the high temperature double-reheat pipe 35 are required to be made of high temperature alloy steel of 600° C. class.

As shown in FIG. 3b, the high-level unit 21 and the high-level generator 41 constitute the high-level shafting. As shown in FIG. 3c, the low-level unit 22 and the low-level generator 42 constitute the low-level shafting which is in a lower-position arrangement.

As shown in FIG. 3a, the special characteristic of the present invention is that the high-level unit 21 with a high-level generator 41 constitutes the high-level shafting, which is positioned on a high-level platform 5. The high-level platform 5 is positioned outside of the boiler body 14 and approximately corresponding to the header-connection area 17. The integral cylinder formed by integrating the HP cylinder 211 and the IP cylinder I 212 is used as the high-level unit 21 that is arranged on the high-level platform 5 in the front of the tower type boiler. The steam inlets and outlets of the HP cylinder 211 and the IP cylinder I 212 are arranged as close as possible to the header-connection area 17. The steam inlets and outlets of the high-level unit 21 are connected with the header of the steam inlets and outlets of the superheaters and reheaters by means of the HTHP pipe 3. The low-level unit 22 comprises an IP cylinder II 221 and two LP cylinders 222, and constitutes the low-level shafting along with a low-level generator 42, which is still in the lower-position arrangement in the conventional turbine hall.

The high-level platform 5 and the high-level shafting arranged thereon can have a balance in weight with a flue 19 provided at the rear of boiler body 14, so as to guarantee the safety of the integral structural steel design. In other embodiments of the present invention, the high-level platform can be omitted, and instead, the high-level shafting is lifted by means of suspending.

According to this arrangement scheme, since the HP cylinder 211 and the IP cylinder I 212 in the high-level unit 21 are positioned close to the header-connection area 17, the main steam pipe 31 extending from the outlet of the superheater 13 of the boiler 1 to the HP cylinder 211 of the turbine is greatly shortened, and thereafter the steam exhausted from the HP cylinder 211, namely the low temperature single-reheat steam, directly returns to the single-reheater 12 of the boiler for heating by way of the low temperature single-reheat steam pipe 32. The heated high temperature single-reheat steam is transmitted to the IP cylinder I 212 only by way of the high temperature single-reheat pipe 33. Subsequently, after doing work, the low temperature double-reheat steam directly returns to the boiler 1 by way of the low temperature double-reheat steam pipe 34. Finally, after being heated through the double-reheater, the high temperature double-reheat steam is sent to the turbo-generator hall in the lower-position arrangement by way of the steam pipe 35 in a conventional path, and flows into the IP cylinder II 222 and the LP cylinder 221 of the low-level unit 22 to continue to do work for power generation. In this way, in the turbo-generator unit of the present invention with the high-level shafting and the low-level shafting arranged in different levels, the steam pipe system with the existing five circuits in the prior art, namely the main steam pipe 31, the low temperature single-reheat steam pipe 32, the high temperature single-reheat steam pipe 33, the low temperature double-reheat steam pipe 34 and the high temperature double-reheat steam pipe 35, is so changed that the lengths of the main steam pipe 31, the low temperature single-reheat steam pipe 32, the high temperature single-reheat steam pipe 33 and the low temperature double-reheat steam pipe 34 are shortened to the minimal. If the distance between the boiler 1 and the high-level unit 21 is ignored, the pipe lengths of these four circuits can be substantially negligible, except that of the high temperature double-reheat steam pipe 35.

For the pipe system 3, the investment cost on the HTHP steam pipes of a generating unit, in which the high-level shafting and the low-level shafting are arranged in different levels, will be significantly reduced.

Furthermore, for the quantity of steam stored in the reheat system, as shown in FIG. 3a, the generating unit of this embodiment can significantly reduce the steam storage quantity of the double-reheat system in the conventional arrangement, so that the adjustment performance of the generating unit of the present invention is equivalent to that of the conventional single-reheat generating unit.

Since the double-shaft double-reheat ultra-supercritical turbo-generator unit in this embodiment has the high-level shafting and the low-level shafting arranged in different levels, if compared with the supercritical turbo-generator unit in the prior art, the lengths of the main steam pipe, the low temperature single-reheat steam pipe, the high temperature single-reheat steam pipe and the low temperature double-reheat steam pipe can be reduced to be nearly negligible, so that the investment on the HTHP steam pipes in the steam pipe system is greatly reduced.

In the practical applications of such arrangement design, the high-level unit and the low-level unit can also be independently connected to the power grid by way of by-pass function, causing no influence on each other. Since the IP cylinder I and the IP cylinder II are separately arranged in different levels, in case the high-level unit trips as a result of any fault, the steam can enter the low-level unit by way of the bypass system and can generate power normally. In a similar way, the steam exhausted from the IP cylinder I can also directly flow into the condenser through the bypass system, so that the high-level unit can still operate normally in case of tripping of the low-level unit.

By arranging the IP cylinder II on a conventional platform, it reduces the loads on the high-level platform as well as the length of the shafting system, thus reducing the difficulty in designing such kind of high-level unit for the first time.

In this way, the HTHP steam pipes of the ultra-supercritical turbo-generator unit in this embodiment are greatly shortened, with the following advantages:

Firstly, the investment on the HTHP steam pipe system is sharply reduced.

Secondly, the pipe system resistance is greatly reduced. While a single-reheat system is added, the loss of the total work capability of the turbine is not increased accordingly. Considering the pressure drop of the reheaters themselves, the loss of the total work capacity of the double-reheat system in this embodiment is similar to that of the conventional single-reheat unit.

Further, with the significant reduction in the quantity of the HTHP steam pipes, the heat dissipation loss of the system is reduced accordingly. In addition, since the quantity of the steam stored in the reheat system is not increased, the generating unit of this embodiment has the adjustment inertia similar to that of the conventional single-reheat unit. Generally, the designed pressure drop of the reheat system is 6.7~10% of the reheat steam pressure, and this pressure drop is generally equally shared by the reheat steam pipes and the reheaters. This embodiment of the present invention is taken for example, wherein the high-level unit comprises the HP cylinder and the IP cylinder I, the low-level unit comprises the IP cylinder II and two LP cylinders, and the double-reheat cycle scheme is adopted. For the generating unit in this embodiment, since the low temperature reheat steam pipe and the high temperature reheat steam pipe have been eliminated from the single-reheat system, only the pressure drop of the reheater remains, which means that the pressure drop is reduced by 50%. While in the double-reheat system, only the low temperature double-reheat steam pipe is eliminated, the pressure drop is also reduced by about ¼, with an additional stage of the reheater, the total equivalent pressure drop is merely increased by ¼. Therefore, as compared with the single-reheat cycle of the prior art, the overall double-reheat cycle increases pressure drop merely by ¼. If the length of the main steam pipe in this embodiment is reduced to be negligible, the total work capability of the double-reheat system will be substantially the same as that of the single-reheat system in general.

Thanks to the above advantages, the theoretical thermal economic increase of the double-reheat cycle is fully realized with almost no discount.

Figure 4A:
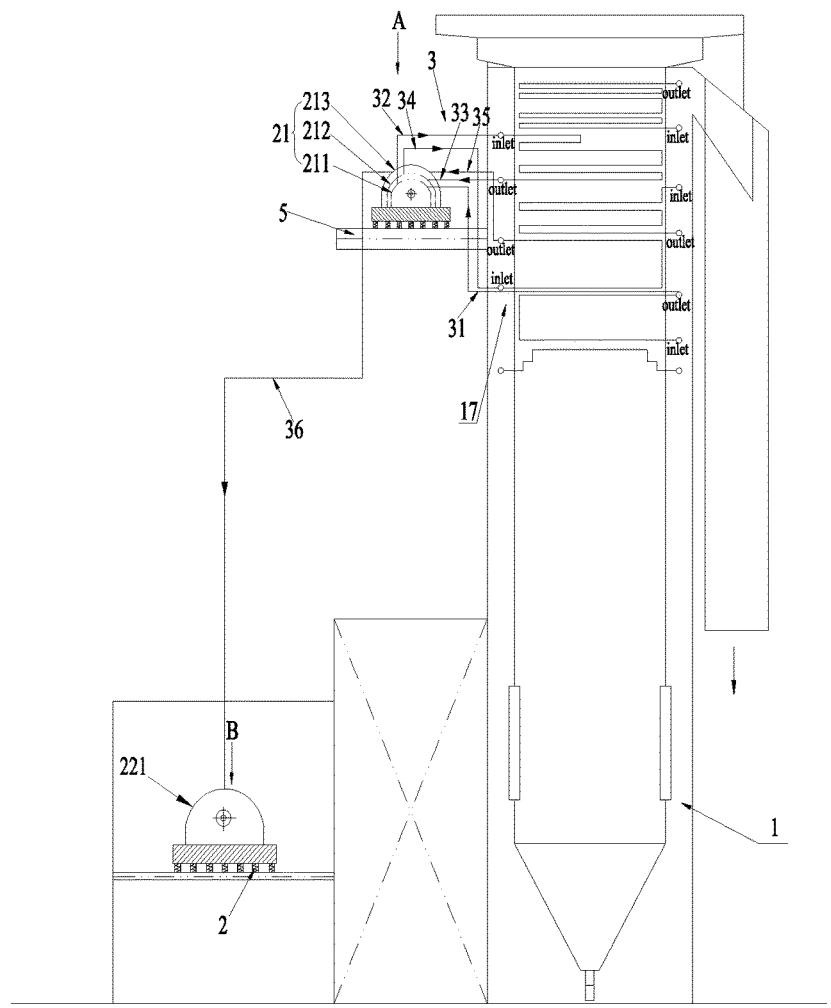
FIG. 4a is a schematic view of the arrangement scheme for the turbo-generator unit of a second embodiment of the present invention.
Figure 4B:
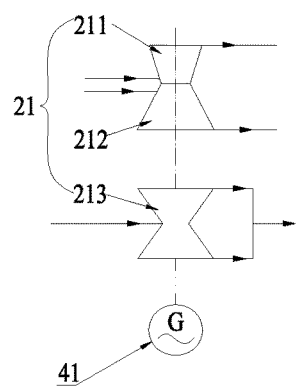
Figure 4C:
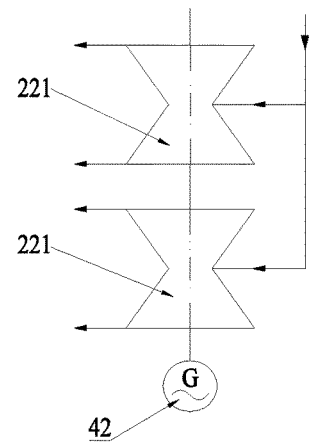

FIGS. 4a, 4b and 4c are schematic views of the arrangement scheme for the turbo-generator unit in the second embodiment of the present invention. This embodiment is much the same as the first embodiment in terms of structure, except that the generating unit 2 further comprises an IP cylinder II 213. The IP cylinder II 213 is arranged on the high-level platform 5 of the high-level unit 21, so that the HP cylinder 211, the IP cylinder I 212, the IP cylinder II 213 and the high-level generator 41 constitute the high-level shafting, which is arranged on the high-level platform 5 in the proximity of the header-connection area 17 of the steam inlets and outlets of the boiler 1. The low-level shafting composed of the two LP cylinders 221 and the low-level generator 42 is arranged on a conventional platform in the turbine hall. In this embodiment, the HP cylinder and the LP cylinders are arranged on the higher position, so that the lengths of all the HTHP pipes are negligible. On the low-level platform, only the LP cylinders are arranged, which can be equipped with a half-speed generator. The length of the blades of the last stage can be increased, so as to greatly reduce the leaving velocity loss and thus improve the efficiency of the LP cylinders. However, if so the manufacturing cost of the half-speed generator will be somewhat increased.

The above two embodiments of the present invention applied in the double-reheat unit have their respective advantages. The decision on adopting which of them shall be made after making comparisons in terms of technical and economical efficiencies in combination with the practical circumstances of the projects.

In this embodiment, all the HTHP steam pipes in the steam pipe system 3 are arranged to be close to the header-connection area 17 of the steam inlets and outlets of the boiler 1, so that their lengths are reduced to be negligible. In this way, the pipe extending downward from the higher position only consists of the steam exhaust pipe 36 of the IP cylinder II extending from the outlet of the IP cylinder II 213 to the LP cylinder 221, which can adequately meet the parameters requirements if it is made of ordinary carbon steel material. With this arrangement scheme, the lengths of all the HTHP steam pipes, such as the main steam pipe 31, the low temperature single-reheat steam pipe 32, the high temperature single-reheat steam pipe 33, the low temperature double-reheat steam pipe 34 and the high temperature double-reheat steam pipe 35, are reduced as much as possible, and thus the investment costs for the conventional "four major pipes" are reduced to the lowest, resulting a considerable drop in the investment cost of the steam pipe system 3. However, if so, it is necessary to additionally install a quick-closing butterfly valve with a large caliber (not shown) in front of the inlet of LP cylinder 221, so as to prevent the LP cylinder from running at excessive speed and thus ensure the safety of the postposition unit. At present, the manufacturing technology for the quick-closing butterfly valve with a large caliber at such pressure class has become a conventional technology.

Therefore, for the units with an extra large capacity or even higher steam parameters (more than 600° C.), the priority may be given to arranging the IP cylinder II 213 on the high-level platform 5 in view of the high price of the double-reheat steam pipes.

Figure 5A:
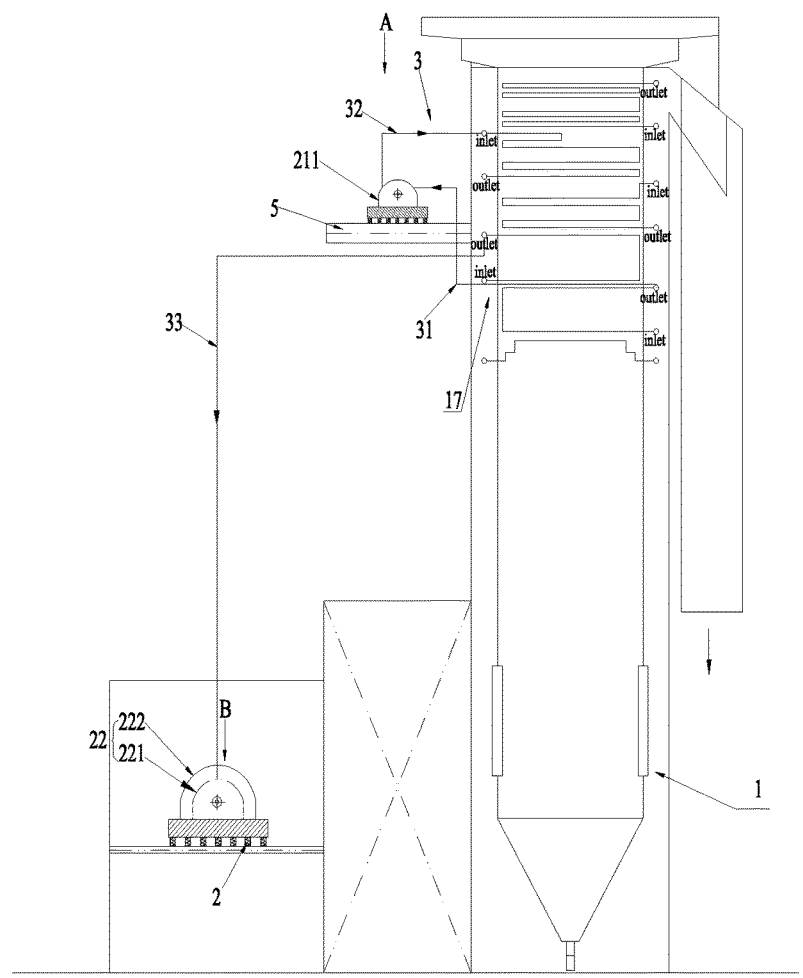
FIG. 5a is a schematic view of the arrangement scheme for the turbo-generator unit of a third embodiment of the present invention.
Figures 5B, 5C:
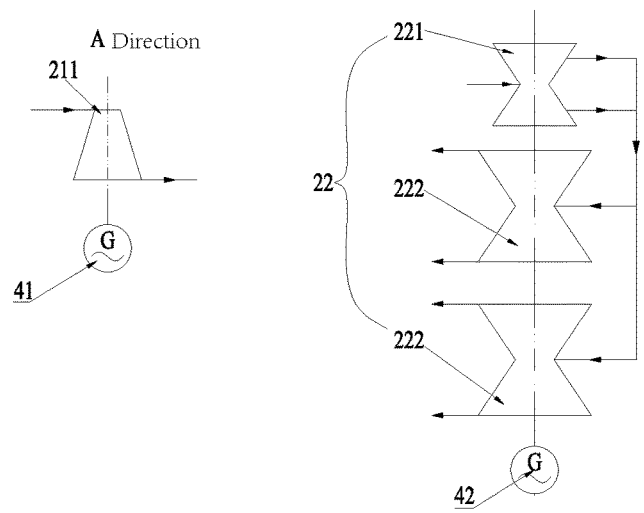

FIGS. 5a, 5b and 5c are schematic views of the arrangement scheme for the turbo-generator unit in the third embodiment of the present invention. The third embodiment is much the same as the first embodiment in terms of the structure, except that this embodiment is the application of the present invention in the single-reheat supercritical turbo-generator unit. The structure of the third embodiment differs from the structure of the first embodiment in that the high-level shafting composed of the HP cylinder 211 in the generating unit 2 and the high-level generator 41 is arranged on the high-level platform 5 in the proximity of the header-connection area 17 of the steam inlets and outlets of the boiler 1, and the low-level shafting composed of the low-level generator 42 and the low-level unit 22, which comprises the IP cylinder 221 and the LP cylinder 222, is arranged on the conventional platform in the turbine hall. Such layout design can achieve such technical effects that, the lengths of the main steam pipe 31 and the cold reheat steam pipe 32 in the steam pipe system 3 are shortened to be almost negligible, and only the length of the hot reheat steam pipe 33 remains equivalent to the existing one, so that the investment for the HTHP steam pipe system is significantly decreased.

Figure 6A:
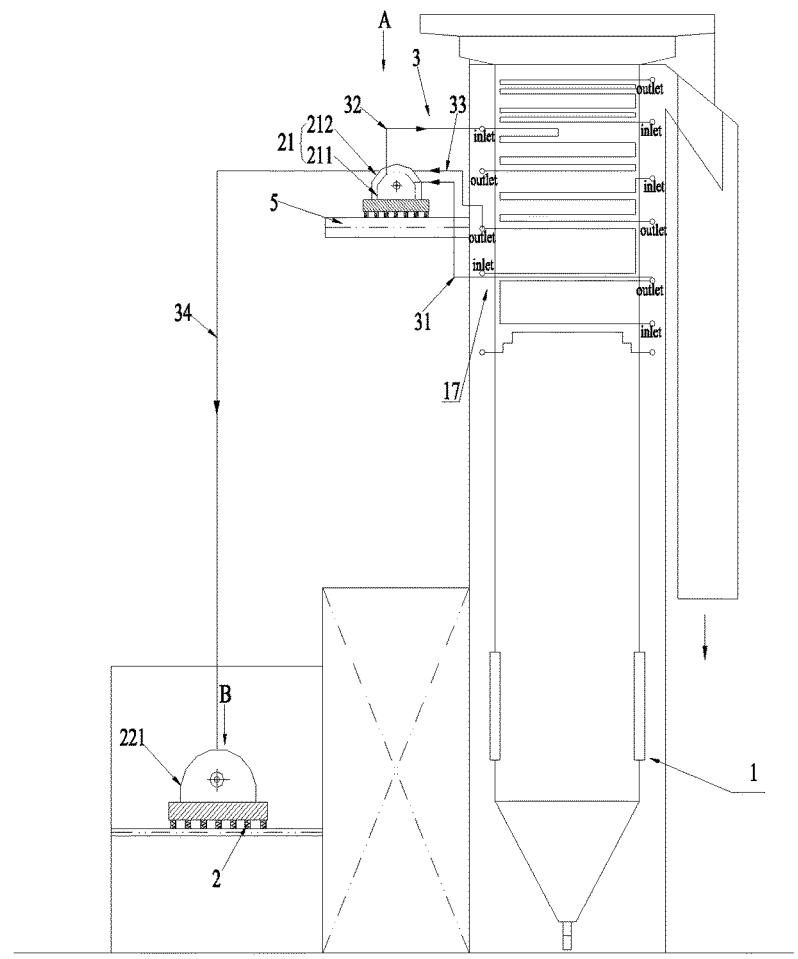
FIG. 6a is a schematic view of the arrangement scheme for the turbo-generator unit of a fourth embodiment of the present invention.
Figures 6B, 6C:
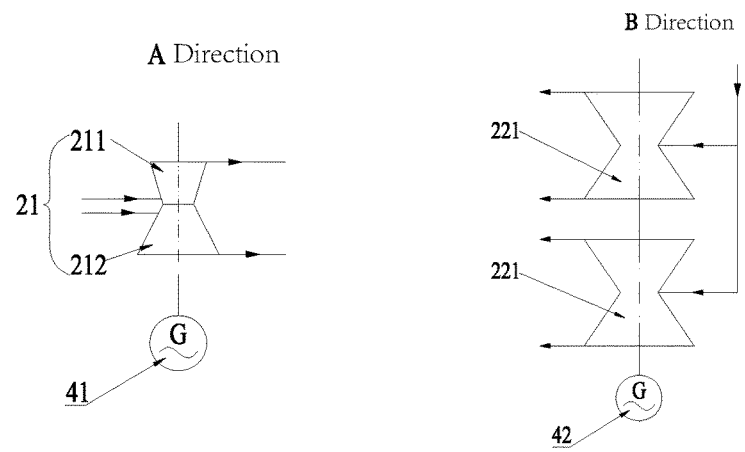

FIGS. 6a, 6b and 6c are schematic views of the arrangement scheme for the turbo-generator unit in the fourth embodiment of the present invention. This embodiment is also an application of the present invention in a single-reheat supercritical turbo-generator unit. The structure of this embodiment is almost the same as that of the third embodiment, except that, in this embodiment, the high-level shafting of the generating unit 2 composed of the high-level generator 41 and the high-level unit 21 comprising the HP cylinder 211 and the IP cylinder 212 is arranged on the high-level platform 5 in the proximity of the header-connection area 17 of the steam inlets and outlets of the boiler 1, and the low postposition shafting, composed of the LP cylinder 221 and the low postposition generator 42, is arranged on the conventional platform in the turbine hall. Such layout design can achieve such technical effects that the lengths of the main steam pipe 31, the cold reheat steam pipe 32 and the hot reheat steam pipe 33 in the steam pipe system 3 are almost negligible, and thus the lengths of all the HTHP steam pipes are reduced to the minimum. The pipe extending downward from the high level consists of the steam exhaust pipe 34 of the IP cylinder only that extends from the outlet of the IP cylinder 212 to the LP cylinder 221, which can adequately meet the parameter requirements if it is made of ordinary carbon steel. As a result, the investment costs for the pipe system can be significantly decreased.

Figure 7A:
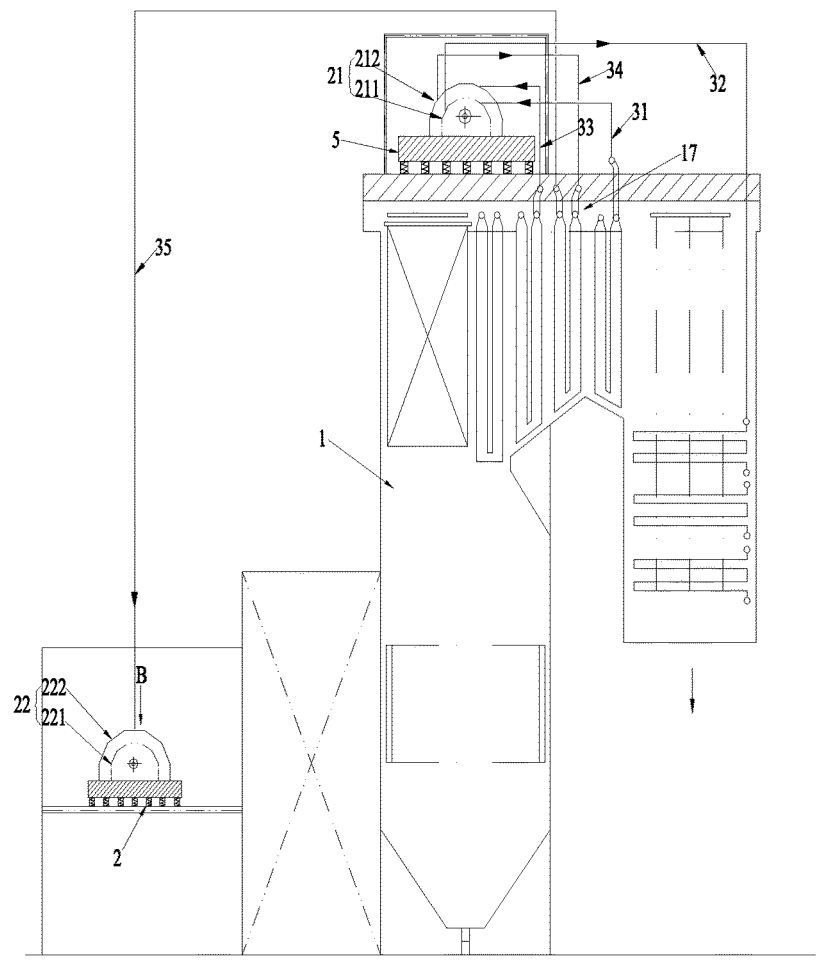
FIG. 7a is a schematic view of the arrangement scheme for the turbo-generator unit of a fifth embodiment of the present invention.
Figures 7B, 7C:
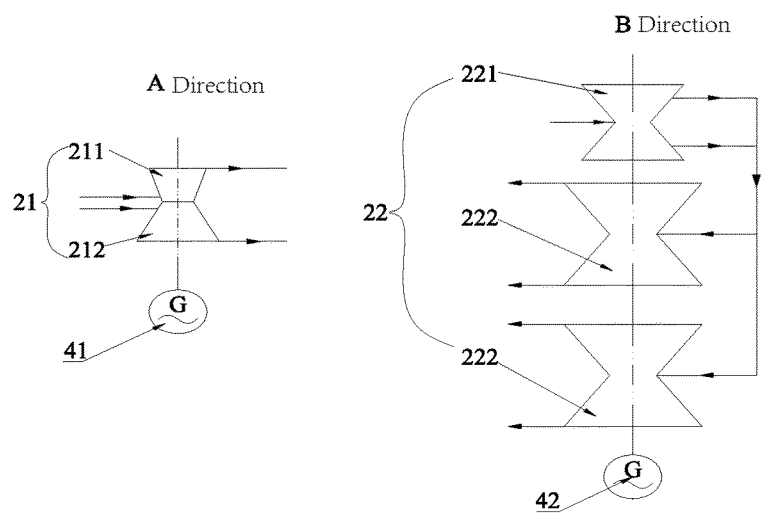

FIGS. 7a, 7b and 7c are schematic views of the arrangement scheme for the double-reheat turbo-generator unit in the fifth embodiment of the present invention. The structure of this embodiment is almost the same as that of the first embodiment, except that the boiler applied in the unit is of Π type. As shown in FIG. 7a, the integral cylinder in the generating unit 2, which is formed by integrating the HP cylinder 211 and the IP cylinder I 212 and functions as the high-level unit 21, which is arranged on the platform 5 at the top of the Π type boiler 1. The steel structure of the Π type boiler 1 can withstand the weight of this part. The low-level unit 22 is composed of the LP cylinder 221 and the IP cylinder II 222, and is still in the conventional lower-position arrangement. The high-level unit 21 with a high-level generator 41 constitutes the high-level shafting. The low-level unit 22 with a low-level generator 42 constitutes the low-level shafting. As the high-level shafting is arranged at the high level in the proximity of the header-connection area 17 of the steam inlets and outlets of the boiler 1, the lengths of the HTHP pipes 31, 32, 33 and 34 in the steam pipe system 3 are substantially negligible, and only the high temperature double-reheat steam pipe 35 remains. As a result, the investment cost for pipes can be greatly reduced, the resistance loss is decreased and the adjustment performance of the unit is improved.

Figure 8A:
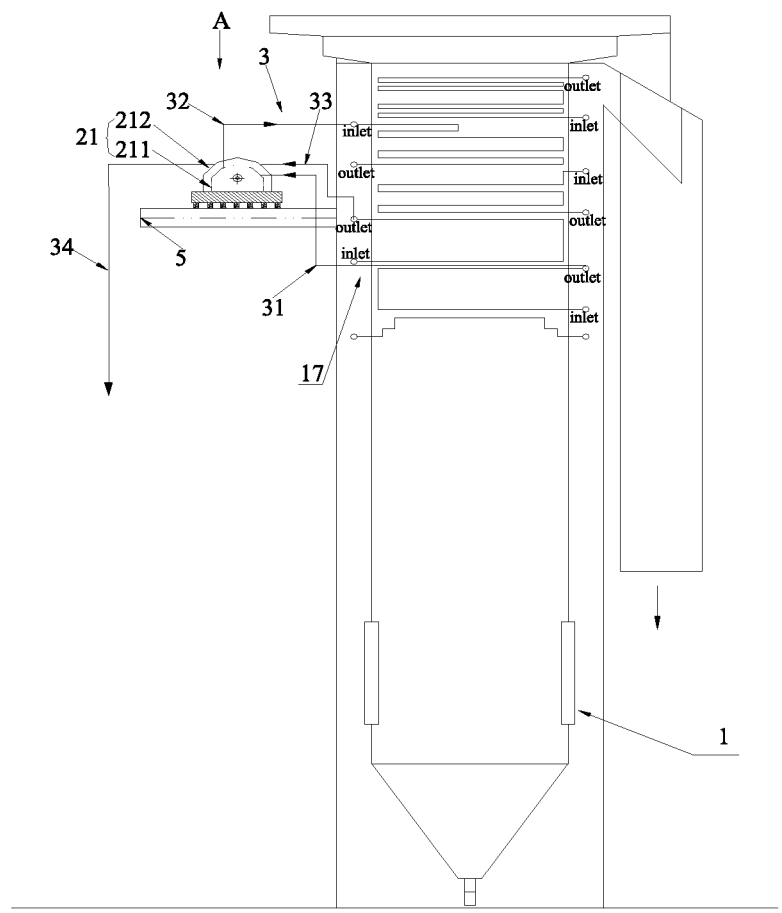
FIG. 8a is a schematic view of the arrangement scheme for the turbo-generator unit of a sixth embodiment of the present invention.
Figure 8B:
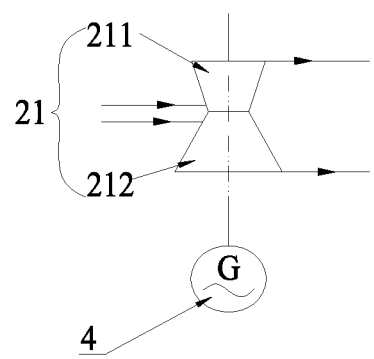

FIGS. 8a and 8b are schematic views of the arrangement scheme for the backpressure steam turbine unit in the sixth embodiment of the present invention. The structure of this embodiment is almost the same as that of the first embodiment except that the low-level unit is eliminated from the backpressure steam turbine unit. In this embodiment, the high-level shafting, which is composed of the high-level generator 4 and the high-level unit 21 comprising the HP cylinder 211 and the IP cylinder 212, is arranged on the high-level platform 5 in the proximity of the header-connection area 17 of the steam inlets and outlets of the boiler 1, the low-level shafting conventionally located on the low-level platform is eliminated, and the steam exhausted from the outlet of the IP cylinder 212 is directly fed to the heat supply users.

As the result of the above arrangement scheme, the lengths of the HTHP steam pipes 31, 32 and 33 in the steam pipe system 3 can be greatly reduced, and only the ordinary exhaust steam pipe 34 extending downwards from the outlet of the IP cylinder remains, so that the investment cost can be greatly reduced, the resistance loss is decreased and the adjustment performance of the unit is improved.

Only one arrangement scheme for applying the present invention in the backpressure type unit is provided in this description. In other embodiments of the present invention, it is also feasible to arrange the IP cylinder on the conventional low-level platform and only arrange the HP cylinder on the high-level platform; this practice is also applicable to the double-reheat unit.

With the design scheme for the high-level and low-level shafting arrangement adopted for the turbo-generator unit of the present invention, the turbo-generator unit is divided into two shaftings, namely the high-level shafting and the low-level shafting, which are arranged in different levels. The turbo-generator unit of the present invention differs from the conventional generating unit in the arrangement of the high-level shafting and the low-level shafting. The high-level shafting is arranged on the high-level platform in the proximity of the header of the outlet of the superheater and the header of the outlet of the reheater in the boiler, and the low-level shafting is arranged on a conventional platform in the turbine hall.

As considered with respect to the boiler, the weights of the high-level shafting and the whole platform are substantially negligible as compared with the weight of the boiler. Therefore, it is not difficult to suspend the high-level shafting along with the whole platform on the big plate girder, and, in case of a Π type boiler, it is even easier to install the high-level unit at the top of the boiler. In the process of design, it is critical to consider the arrangement and the foundation design for the high-level turbo generator that is arranged at the top of the boiler or in front of the boiler, the absorption of vibration energy of the high-level unit, as well as the comprehensive connections with the boiler steel structure and the foundation thereof. All these issues can be addressed on the existing technical platform.

As to the electric system, the separate arrangement of the high-level and the low-level shaftings has no special requirement on the electric system: the generator, the main transformer, the enclosed busbars or the generator outlet circuit breaker, etc., are all well-developed products, just like those used in the conventional double-shaft turbo-generator units in the ordinary power plants, and rich experience in their design, construction and operation has been accumulated. The main electrical connection can be made by means of extended unit wiring, and one main transformer is provided; alternatively, the main electrical connection may be made by means of generator-transformer group unit wiring, two main transformers are provided, and the high-level generator and the low-level generator are separately connected to the power grid. This is the main connection mode commonly used in the domestic power plants at present, which has the advantages that rich experience has been accumulated and less investment costs are needed; alternatively, circuit breakers may be provided at the outlets of the generators, so that the high-level generator and the low-level generator may be connected to the power grid either on the HV (High Voltage) side or on the LV (Low Voltage) side. This scheme has the benefits that, the main transformer can deliver power back to the station service, so that the starting standby transformer is eliminated, but an additional generator breaker is needed. The investments in the two aspects can be balanced. The above main connection mode is applicable to various embodiments of the present invention.

For the wiring connection of the generator-transformer-group units in the separate arrangement, the main transformers can be in a centralized arrangement on the booster station side outside the main building, that is to say, two main transformers are arranged together and the enclosed busbars of the high-level generator are routed through the main power building. Where possible, the main transformers may be separately arranged in the vicinity of their respective generators, e.g., one main transformer is arranged on the booster station outside the main power building, the other one is arranged in the proximity of the high-level generator platform or the boiler, so as to reduce the lengths of the enclosed busbars.

Although the generating capacity is limited by the output of a primer mover when the main connection mode and the arrangement scheme are adopted, the output of the primer mover can reach as high as 1300~1500 MW (boiler: firing bituminous coal; turbo-generator unit: double-shaft) by using the well-developed technologies currently available for the boilers and turbines. Therefore, the unit capacity of this design is far more than 1000 MW, which is the capacity a single-shaft unit can reach at present. That is to say, the main connection mode and the arrangement scheme can not only reflect the scale effect of the large-sized units, but also meet the requirements for power transmission.

If a single large-capacity generator is divided into two small-capacity generators, there will be no obvious increase in the total manufacturing cost. Of course, using the double-reheat system in compliance with the arrangement scheme for the high-level and the low-level shaftings as in the present invention will result in an increase in investment costs on the boilers and the turbines. However, with the significant reduction in the investment on the HTHP steam pipes, the total unit price will be similar to that of the units in the prior art. From the view of improving the efficiency, the double-reheat steam turbine unit with two shafts arranged at the high level and the low level respectively has the following advantage: the generating unit of the present invention is more cost effective with a wider capacity span.

Firstly, the IP cylinder I is designed as of single-flow type and is integrated with the single-flow HP cylinder. The single-flow IP cylinder has an increased blade height, which significantly improves the efficiency of the IP cylinder I; the steam flow direction thereof is opposite to that of the HP cylinder, and is substantially in equilibrium with the thrusts formed by the HP cylinder, thereby eliminating the need of the balance drum, reducing the steam leakage loss and improving the efficiency of the HP cylinder; in addition, because the leakage steam from the gland seals of the HP cylinder directly flows into the IP cylinder I, the steam leakage from the gland seals of the HP cylinder is reduced and the steam leakage from the gland seals on the steam entry side of the IP cylinder I are eliminated, which further improves the overall efficiency. Since the steam exhaust pressure of the IP cylinder I is as high as 2~3 MPa, its blades at the last stage are not overlong, so it is relatively easy to integrate the HP cylinder and the IP cylinder I.

Figure 9:
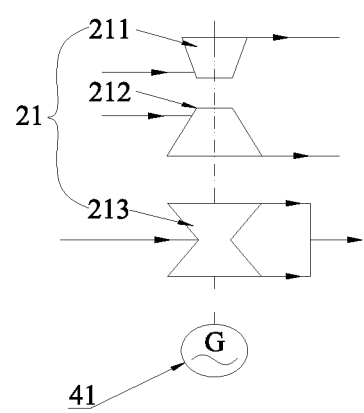
FIG. 9 is a schematic view of another arrangement scheme for the high-level shafting in the second embodiment of the present invention.

FIG. 9 is a schematic view of another arrangement scheme for the high-level shafting of the second embodiment of the present invention. The arrangement scheme for the high-level shafting in this embodiment differs from the arrangement scheme for the integral cylinder composed of the HP cylinder 211 and the IP cylinder I 212 in the second embodiment 2 in that the separate arrangement is adopted for the HP cylinder 211 and the IP cylinder I 212 in this embodiment, i.e., the HP cylinder 211 and the IP cylinder I 212 are arranged separately. On the whole, this arrangement scheme can achieve the same technical effects as that of the integral arrangement scheme for the cylinders.

In other embodiments of the present invention, the high-level shafting of multiple cylinders may also be arranged separately in this manner, and are not to be described in the description one by one.

The design concept of the present invention, namely two shafts being arranged at the higher level and the lower level respectively, is applicable to the generating units with various configurations listed in the table below. As is well known to those skilled in the art, the quantity of the IP cylinders is not limited to two.

| | HP cylinder | IP cylinder I | IP cylinder II | LP cylinder (n pieces) |
|---|---|---|---|---|
| single-reheat backpressure type unit (one HP cylinder and one IP cylinder) | high-level high-level | low-level high-level | none none | none none |
| single-reheat backpressure type unit (one HP cylinder and two IP cylinders) | high-level high-level | high-level high-level | low-level high-level | none none |
| single-reheat condensing stem type unit (one HP cylinder, one IP cylinder and n LP cylinders) | high-level high-level | low-level high-level | none none | low-level low-level |
| double-reheat condensing steam type unit (one HP cylinder, two IP cylinders and n LP cylinders) | high-level high-level | high-level high-level | low-level high-level | low-level low-level |

Note:
the condensing steam unit includes the extraction condensing turbine unit.

Since the generating unit is in the double-shaft arrangement, the capacity of the turbo generator can significantly exceed the present level. For the HP cylinder, when the regulating stage is not adopted, the increase of power will unlikely affect the safety of the blades of the first stage, and the increase in the mass flow can compensate the drop of specific volume caused by the increase in the main steam pressure, thus ensuring the internal efficiency of the HP cylinder. In the same way, for the IP cylinder, the increase of the mass flow is also helpful to the increase of the internal efficiency. For the low-level unit, after the increase of the mass flow, it is feasible to add an LP cylinder to guarantee the exhaust area. Even if the IP Cylinder II is combined with three LP cylinders, the postposition turbine equipped with four cylinders does not exceed the stable configuration of the shafting in the current single-shaft unit. If the postposition turbine is equipped with four cylinders, and the steam exhaust area of the LP cylinders is assumed as 3×12.5 m², the unit capacity can reach the level of 1500 MW.

Taking a single-reheat 2×1000 MW ultra-supercritical unit of 28 MPa/600° C./600° C. class in the prior art as an example, the total investment for construction of such a single-reheat unit will be about RMB 8 billion, including the investment of about RMB 0.35 billion on the "four major pipes" (i.e., the main steam pipe, the high temperature reheat steam pipe, the low temperature reheat steam pipe and the high pressure water supply pipe). If the double-reheat design with the same temperature and pressure class is adopted in such unit, with the parameters of 28 MPa/600° C./600° C./600° C., the unit cycle efficiency can be increased by about 5%. If so, the quantity of the reheat steam pipes has to be doubled, and each turbine needs an additional IP cylinder, with an additional stage of the reheat, resulting an increased manufacturing cost of the boiler. Moreover, since even a bigger plant building space is required for the arrangement of the newly added double high-temperature and low-temperature reheat steam pipes, resulting in a considerable increase in the investment cost for construction of the plant buildings. In contrast, if the scheme of the present invention is adopted, the cost of the high temperature steam pipes will be saved by more than 80%, and this part of saving in investment can be used to compensate the increase in the investment on the boiler and the steam turbine with the additional single-reheat. In general, the manufacturing cost thereof will be similar to that of the single-reheat ultra-supercritical unit at the same temperature and pressure class. The unit efficiency of the former will be increased by about 5%~6% compared to the latter and it is expected that the heat efficiency of the unit will exceed 48%, taking into account of the decrease in the pipe pressure drop and the improvement in the overall turbine efficiency. An ultra-supercritical power plant equipped with two 1000 MW units can save coal consumption for more than 200,000 tons per year if such design is adopted.

Except for those backpressure type units which are only equipped with the high-level units, the starting and operating modes of the turbo-generator unit of the present invention are the same as those of the conventional two-shaft units. As to the power transmission of the high-level units, the technology used for the enclosed busbars has been well-developed, with its manufacturing costs far less than that of the costly high-alloy steam pipes, thus resulting obvious economic advantages. The applications of the design concept of the present invention in various generating units can not only break through the bottleneck for the development of the next generation of the high efficiency ultra-supercritical units of 700° C. class, but also provide a feasible way for "upgrading" the current subcritical and supercritical units.

The present invention has the following advantages and effects: due to the separate arrangement of the turbo-generator units at the high and low levels, the lengths of the HTHP pipes and the system resistance are significantly reduced, the quantity of the steam stored in the reheat system and the adjustment inertia of the units are decreased, and the theoretical benefits of the double-reheat or multiple-reheat are regained without any discount. The thermal efficiency of the system is significantly improved at the same manufacturing cost; the bottleneck for the unit capacity is broken through; and a new space has been provided for further development of the thermal generating units.

In summary, the description only gives several preferred embodiments of the present invention. Any technical solutions that can be achieved by those skilled in the art by way of logical analysis, reasoning or limited experiments on the basis of the prior art and according to the conception of the present invention, shall fall within the scope of the claims of the present invention.

What is claimed is:

1. A turbo-generator unit; comprises:
a boiler, comprising a boiler body, a superheater and a reheater; the superheater and the reheater respectively has a steam inlet and a steam outlet which form a header of steam inlets and steam outlets;
a high-level shafting comprising a high-level turbine unit and a high-level generating unit horizontally connected with the high-level turbine unit, and the high-level turbine unit comprises a HP cylinder;
and a steam pipe system, comprising steam pipes that connect the boiler with the high-level turbine unit;
wherein the high-level shafting is horizontally shafted on a high-level platform outside of said boiler and adjacent to the header of steam inlets and steam outlets so as to shorten a length of the steam pipes that connect the boiler with the high-level turbine unit; and the high-level shafting is not positioned on the boiler.

2. The turbo-generator unit of claim 1, wherein the high-level turbine unit further comprises an IP cylinder.

3. The turbo-generator unit of claim 2, further comprises a second turbine unit comprising a LP cylinder, wherein the second turbine unit is arranged at a low-level platform.

4. The turbo-generator unit of claim 3, wherein the second turbine unit further comprises an IP cylinder.

5. The turbo-generator unit of claim 1, wherein the high-level turbine unit further comprises two IP cylinders.

6. The turbo-generator unit of claim 1, further comprises a second turbine unit comprising a LP cylinder; wherein the second turbine unit is arranged on a low-level platform, and the high-level turbine unit further comprises two IP cylinders.

7. The turbo-generator unit of claim 1, further comprises a second turbine unit comprising an IP cylinder; wherein the second turbine unit is arranged on a low-level platform.

8. The turbo-generator unit of claim 1, further comprises a second turbine unit comprising a IP cylinder; wherein the second turbine unit is arranged on a low-level platform, and the high-level turbine unit further comprises an IP cylinder.

9. The turbo-generator unit of claim 1, further comprises a second turbine unit comprising an IP cylinder and a LP cylinder; wherein the second turbine unit is arranged on a low-level platform.

* * * * *